United States Patent [19]

Stokes, Jr. et al.

[11] 4,224,086

[45] Sep. 23, 1980

[54] DIP BRAZING FLUX

[75] Inventors: John J. Stokes, Jr., Murrysville; James H. Crooks, Apollo, both of Pa.

[73] Assignee: Aluminum Company of America, Pittsburgh, Pa.

[21] Appl. No.: 40,157

[22] Filed: May 17, 1979

[51] Int. Cl.$^2$ .............................................. C22B 9/10
[52] U.S. Cl. ........................................ 148/26; 75/53; 75/257; 228/223
[58] Field of Search ...................... 148/26; 75/53, 257; 228/223

[56] References Cited

U.S. PATENT DOCUMENTS

| | | | |
|---|---|---|---|
| 2,396,604 | 3/1946 | Reimers | 148/26 |
| 3,189,491 | 6/1965 | Robbins | 75/257 |
| 3,512,959 | 5/1970 | Joseph | 75/257 |
| 3,728,783 | 4/1923 | Chartet | 148/26 |
| 3,892,561 | 7/1975 | Takashima | 148/26 |
| 3,936,326 | 2/1976 | Muller | 148/26 |

*Primary Examiner*—P. D. Rosenberg
*Attorney, Agent, or Firm*—Andrew Alexander

[57] ABSTRACT

A dip brazing flux for brazing alluminum alloy surfaces is disclosed comprising $CaCl_2$, NaCl, KCl and $AlF_3$ characterized by a low formation of $CaF_2$ when the flux is maintained in a molten condition.

8 Claims, 1 Drawing Figure

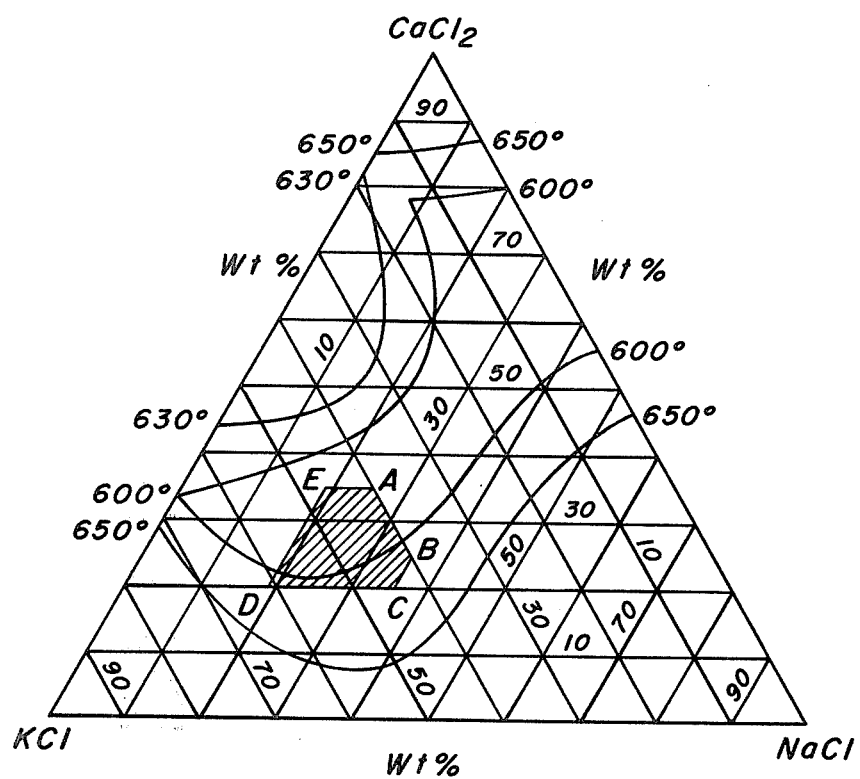

DIP BRAZING FLUX

BACKGROUND OF THE INVENTION

This invention relates to a brazing flux. More particularly, this invention relates to a dip brazing flux for brazing aluminum alloy surfaces.

The joining together of metal surfaces is accomplished either by melting the surfaces to cause a fusion therebetween, which is normally referred to as a welding type joint, or by providing a lower melting temperature alloy between the surfaces to be joined together which melts and wets the surfaces of the metals without melting the metals themselves. Depending upon the joining temperature, such operations are usually referred to either as brazing or soldering. In all of the foregoing joining operations, the presence of metal oxides on the surfaces of the metals to be joined can interfere with a proper joining together of the surfaces.

It has therefore become the accustomed practice in the various joining arts to use materials known as fluxes which will have a solvent effect on such oxides to provide clean surfaces to insure proper wetting of the solid metal surface by the liquid metal. Such fluxes normally comprise metal halides, particularly alkali metal halides such as sodium or potassium chloride or fluoride.

The flux or fluxing agent may be applied in a number of ways as by dusting a powdered mixture of the flux ingredients onto the surface prior to the joining operations, applying a liquid paste of the material or, in the case of dip brazing, by providing a molten mixture of the flux into which the parts to be brazed are dipped. The molten batch also then provides the necessary heat to melt the alloy material which is used as the brazing metal between the surfaces to be joined together.

In the joining together of aluminum alloy materials, a flux must be used to remove aluminum oxide which would otherwise interfere with the proper joining together of the parts. Sometimes calcium chloride is used in such fluxes, however not without problems, particularly when used in conjunction with NaF or $AlF_3$. For example, it has been found that the presence of fluoride ions and calcium ions in some flux compositions may result in the formation of an insoluble compound, calcium fluoride, when the flux is used in a molten bath for brazing purposes. The calcium fluoride formation is detrimental in that it acts to deplete the flux of these constituents prematurely, often resulting in the flux having a useful life of not more than one day. Such a short life makes the use of this type of flux quite impractical from an economic viewpoint.

Fluxes employing a metal fluoride and chlorides of sodium, potassium and calcium are known for welding magnesium. Such a use is disclosed in U.S. Pat. No. 2,396,604. However, as well as using the flux for welding magnesium, the patent discloses that the flux is applied by dusting or a paste mixture in water, alcohol or oil, and preferably uses sodium fluoride therein. Thus, the stability of the flux would not be a problem. In welding, the filler metal has essentially the same composition as the components to be joined and an appreciable amount of the parent metal is melted during the joining process. Brazing is considered to be a different joining process in that the filler metal is typically an alloy which melts at lower temperatures than the parent metal and usually melting of the parent metal does not occur.

Since dip brazing fluxes are preselected to provide an operating temperature which will be above the melting point of the brazing alloy, yet below the melting point of the surfaces to be joined, only particular combinations and ratios of metal salts, such as metal halides may be used, which will provide such a temperature range.

SUMMARY OF THE INVENTION

In accordance with the invention, a novel dip brazing flux and brazing system are provided whereby aluminum alloy surfaces may be joined together by the use of a dip brazing flux comprising $CaCl_2$, NaCl, KCl and $AlF_3$ characterized by a low formation of $CaF_2$ when the flux is maintained in molten form.

BRIEF DESCRIPTION OF THE DRAWING

The sole drawing of the invention is a ternary diagram for the system $CaCl_2$-KCl-NaCl showing the preferred proportions of the three ingredients.

DESCRIPTION OF THE INVENTION

In accordance with the invention, the flux comprises $CaCl_2$, NaCl and KCl. The amount of each chloride is about 27.5 to 32.0 wt.% $CaCl_2$, 13.5 to 22.0 wt.% NaCl and 39.2 to 51.0 wt.% KCl with preferred amounts being 29.0 to 32.0 wt.% $CaCl_2$, 17.0 to 20.0 wt.% NaCl and 40.0 to 45.0 wt.% KCl. A typical amount of each of these constituents is about 31.0 wt.% $CaCl_2$, 17.5 wt.% NaCl and 43.5 wt.% KCl.

To the above chloride base is added 5 to 8 wt.% aluminum fluoride (calculated by total wt.% of the fluoride-chloride mixture). Preferably the amount of aluminum fluoride is about 6 to 7 wt.%, with a typical amount being about 6.5 wt.%. For purposes of aiding in improving the fluidity of the molten flux, up to about 5 wt.% LiCl may be added, with a preferred amount being not greater than 3.0 wt.%.

The flux is normally used at a temperature of at least 582° C. (1080° F.) but may of course be used at a higher temperature as long as the temperature does not exceed the temperature of the aluminum alloy surfaces to be joined together (e.g. less than 658.7° C. if pure aluminum were used). It should be noted here that the flux of the invention can be used not only with pure aluminum surfaces but with aluminum alloys as well, such as 1100, 3003, 5005, 6063 (Aluminum Association designations). Further, it will be noted that when alloys of aluminum are used, the temperature of the molten bath must be adjusted accordingly to maintain it below the melting temperature of the surfaces to be joined together yet above the melting point of the brazing alloy.

In the joining together of aluminum alloy surfaces to be brazed, the surfaces are first cleaned in any suitable manner as is well known to those skilled in the art prior to immersion in the molten flux bath. This cleaning may include mechanical cleaning or chemical cleaning or a combination. This cleaning is recommended to avoid contamination of the bath as well as to assist in the removal of the metal oxides present on the surface. A thin sheet of the brazing alloy is then placed between the aluminum alloy surfaces to be brazed together, and the assembly is then preferably clamped or secured together by various means, such as mechanical clamping or spot welding, etc. It will be noted that a brazing layer which is bonded to the parent metal may also be used. The assembly is then dipped into the molten flux for a period of from 20 to 240 seconds. After removal from the molten bath, the now brazed together assembly may be rinsed in water to remove excess flux. The assembly may then be dipped in a nitric acid solution, e.g. about 35.0 wt.% for about 15 seconds to remove any residue remaining on the brazed part.

For purposes of the invention, it is important that the calcium, potassium and sodium chloride salts be maintained at concentrations in the area defined by the points A, B, C, D, E in the figure when used in conjunction with the source of fluoride as referred to hereinabove. It has been discovered that if the aluminum fluoride, for example, is permitted to exceed the level referred to, calcium fluoride forms and settles out in the molten flux bath. It is important to minimize the formation of calcium fluoride for at least two reasons. First, if the fluoride level is not maintained, the molten flux loses substantial activity or effectiveness with respect to promoting the brazing operation. That is, low levels of the fluoride can result in poor fillet being formed during the brazing process. Secondly, permitting calcium fluoride to form removes or wastes fluoride in the flux without any benefit during the brazing operation which, of course, interferes with the economies of the system.

In accordance with the invention, the expression "low formation of $CaF_2$" is defined as when the amount of $CaF_2$ formed when the flux is maintained in molten form for an extended period of time is less than 5.0% of the total flux. An extended period of time is defined as a period over 24 hours (one day) but less than 168 hours (one week).

To illustrate the invention, two pieces of 3003 Aluminum Association Alloy were joined together using a 4047 brazing alloy. A molten flux bath was used containing 31.5 wt.% $CaCl_2$, 17.9 wt.% NaCl, 44.1 wt.% KCl and 6.5 wt.% $AlF_3$. The bath was maintained at a temperature of about 601° C. After brazing, the metallurgical bond was examined microscopically to determine the sufficiency of the braze, and it was found to be satisfactory.

To further test the sufficiency of the novel flux, the same molten bath was maintained at a temperature of from about 525° to 540° C. for five days after which a second braze was made, and results again examined to determine the sufficiency of the metallurgical bond. The second metallurgical bond was found to be as satisfactory as the first, indicating that the flux after such a time period had not lost its activity which in turn indicated the lack of deleterious amounts of $CaF_2$ formation.

While the invention has been described in terms of preferred embodiments, the claims appended hereto are intended to encompass other embodiments which fall within the spirit of the invention.

What is claimed is:

1. A molten dip brazing flux for brazing aluminum alloys containing NaCl, KCl, $CaCl_2$ and at least one fluoride salt selected from the group consisting of sodium, potassium, lithium and aluminum fluoride, the flux characterized by formation of $CaF_2$ in an amount not greater than 5.0 wt.% of the total flux when it is maintained in molten condition for an extended period of time.

2. The dip brazing flux in accordance with claim 1 wherein the flux contains 13.5 to 22.0 wt.% NaCl, 39.2 to 51.0 wt.% KCl and 27.5 to 32.0 wt.% $CaCl_2$, based on the chloride components.

3. The method according to claim 1 wherein the chloride component contains a maximum of 5.0 wt.% LiCl.

4. The dip brazing flux in accordance with claim 1 wherein the fluoride salt is aluminum fluoride.

5. The dip brazing flux in accordance with claim 1 wherein the flux contains 5 to 8 wt.% aluminum fluoride based on the total weight of flux.

6. The dip brazing flux in accordance with claim 1 wherein the flux contains 17.0 to 20.0 wt.% NaCl, 40.0 to 45.0 wt.% KCl and 17.0 to 20.0 wt.% $CaCl_2$, based on the chloride components and 6 to 7 wt.% aluminum fluoride based on the total weight of flux.

7. A molten dip brazing flux for brazing aluminum alloy surfaces comprising NaCl, KCl and $CaCl_2$, the amounts present being selected so as to fall within the shaded area shown in the drawing and also containing from 5 to 8 wt.% $AlF_3$ based on the total weight of the four salts and further characterized by formation of $CaF_2$ in an amount not greater than 5.0 wt.% of the total flux when the flux is maintained in molten condition for an extended period of time.

8. A method of joining together aluminum alloys by brazing which comprises dipping the aluminum alloy surfaces together with a brazing alloy positioned adjacent said surfaces into a molten flux bath maintained at a temperature above the melting point of the brazing alloy but below the melting temperature of the aluminum alloy, said flux consisting essentially of a mixture of metal chlorides and aluminum fluoride wherein the metal chlorides are comprised of 13.5 to 22.0 wt.% NaCl, 34.2 to 51.0 wt.% KCl, 27.5 to 32.0 wt.% $CaCl_2$ and 5.0 wt.% LiCl maximum, and the amount of $AlF_3$ is from 5 to 8 wt.% of the total weight of the mixture.

* * * * *